(12) United States Patent
Hodges et al.

(10) Patent No.: US 9,801,035 B2
(45) Date of Patent: Oct. 24, 2017

(54) SYSTEM AND METHOD TO IDENTIFY DEVICES IN A SHARED MOBILE OPERATING PLAN

(71) Applicant: WaveMarket, Inc., Emeryville, CA (US)

(72) Inventors: Daniel Hodges, San Francisco, CA (US); Tasos Roumeliotis, Orinda, CA (US); Scott Hotes, Berkeley, CA (US)

(73) Assignee: Location Labs, Inc., Emeryville, CA (US)

( * ) Notice: Subject to any disclaimer, the term of this patent is extended or adjusted under 35 U.S.C. 154(b) by 0 days.

(21) Appl. No.: 14/159,442

(22) Filed: Jan. 21, 2014

(65) Prior Publication Data

US 2014/0206326 A1   Jul. 24, 2014

Related U.S. Application Data

(60) Provisional application No. 61/754,849, filed on Jan. 21, 2013.

(51) Int. Cl.
| | |
|---|---|
| *H04M 3/42* | (2006.01) |
| *H04W 4/16* | (2009.01) |
| *H04M 15/00* | (2006.01) |
| *H04L 29/06* | (2006.01) |
| *H04W 4/14* | (2009.01) |
| *H04W 4/24* | (2009.01) |

(52) U.S. Cl.
CPC ............ *H04W 4/16* (2013.01); *H04L 63/0807* (2013.01); *H04M 15/7652* (2013.01); *H04W 4/14* (2013.01); *H04W 4/24* (2013.01)

(58) Field of Classification Search
None
See application file for complete search history.

(56) References Cited

U.S. PATENT DOCUMENTS

| | | |
|---|---|---|
| 8,447,279 B1 | 5/2013 | Peng et al. |
| 2002/0169539 A1 | 11/2002 | Menard et al. |
| 2008/0242311 A1 | 10/2008 | Craine et al. |
| 2009/0264070 A1* | 10/2009 | Lim ................... G06Q 30/0261 455/41.2 |
| 2011/0250904 A1 | 10/2011 | Valleta et al. |

(Continued)

*Primary Examiner* — Idowu O Osifade
(74) *Attorney, Agent, or Firm* — Dovas Law, P.C.

(57) ABSTRACT

A method includes communicating, by an application executed by a processor of a first mobile communication device, with a server system. A first phone number corresponding to the first mobile communication device is determined or verified based on the communicating with the server system, the first phone number corresponding to a particular shared operating plan enabled by a particular mobile operator. A request is transmitted to a computing system corresponding to the particular mobile operator for a second phone number corresponding to a second mobile communication device and corresponding to the particular shared operating plan of the first mobile communication device. The second phone number is received from the computing system. The processor of the first mobile communication device determines user identifying information corresponding to the second phone number based on data accessible via the first mobile communication device, and the user identifying information is provided to a user.

18 Claims, 6 Drawing Sheets

(56) References Cited

U.S. PATENT DOCUMENTS

| | | |
|---|---|---|
| 2012/0072340 A1 | 3/2012 | Amron |
| 2012/0163574 A1* | 6/2012 | Gundotra .............. G06Q 10/00 379/114.03 |
| 2013/0177006 A1 | 7/2013 | Baek et al. |
| 2013/0304898 A1* | 11/2013 | Aggarwal ............ H04W 4/023 709/224 |
| 2014/0006517 A1* | 1/2014 | Hsiao .................... G06Q 50/01 709/205 |
| 2014/0099921 A1 | 4/2014 | Weiss |

* cited by examiner

SYSTEM AND METHOD TO IDENTIFY DEVICES IN A SHARED MOBILE OPERATING PLAN

CROSS REFERENCE TO RELATED APPLICATION(S)

This application claims the benefit of U.S. provisional application No. 61/754,849, filed Jan. 21, 2013, which is incorporated by reference as if fully set forth.

BACKGROUND

Many mobile operators sell phone service on shared operating plans (i.e., shared billing plans) where multiple phone lines are collected in a single account, for example a Family Plan in which each member of the family is associated with a particular phone line, and each line corresponds to one account for billing and service authorization purposes.

While mobile operators know the phone numbers on a shared plan, they often do not know much about the associated device and its holder. In particular, the operator often does not know the name of each device holder.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided which includes communicating, by an application executed by a processor of a first mobile communication device, with a particular server system via a network. A first phone number corresponding to the first mobile communication device is determined or verified based on the communicating with the particular server system, the first phone number corresponding to a particular shared operating plan enabled by a particular mobile operator. A request is transmitted via a network to a computing system corresponding to the particular mobile operator for at least a second phone number corresponding to at least a second mobile communication device and corresponding to the particular shared operating plan of the first mobile communication device. The second phone number is received from the computing system corresponding to the particular mobile operator. The processor of the first mobile communication device determines user identifying information corresponding to the second phone number based on data accessible via the first mobile communication device, and the user identifying information is provided to a user of the first mobile communication device.

A telecommunication network is provided including a first mobile communication device and a network connectable processor enabled server system configured for communication with the first mobile communication device. The first mobile communication device is configured to determine or verify a first phone number corresponding to the first mobile communication device based on the communication with the particular server system via a network. The first mobile communication device or the server system is configured to request via a network from a computing system corresponding to the particular mobile operator at least a second phone number corresponding to at least a second mobile communication device and corresponding to the particular shared operating plan of the first mobile communication device. The first mobile communication device or the server system is configured to receive the second phone number from the computing system corresponding to the particular mobile operator. Further, the first mobile communication device is configured to determine user identifying information corresponding to the second phone number based on data accessible via the first mobile communication device and to provide the user identifying information to a user of the first mobile communication device.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Figure 1:
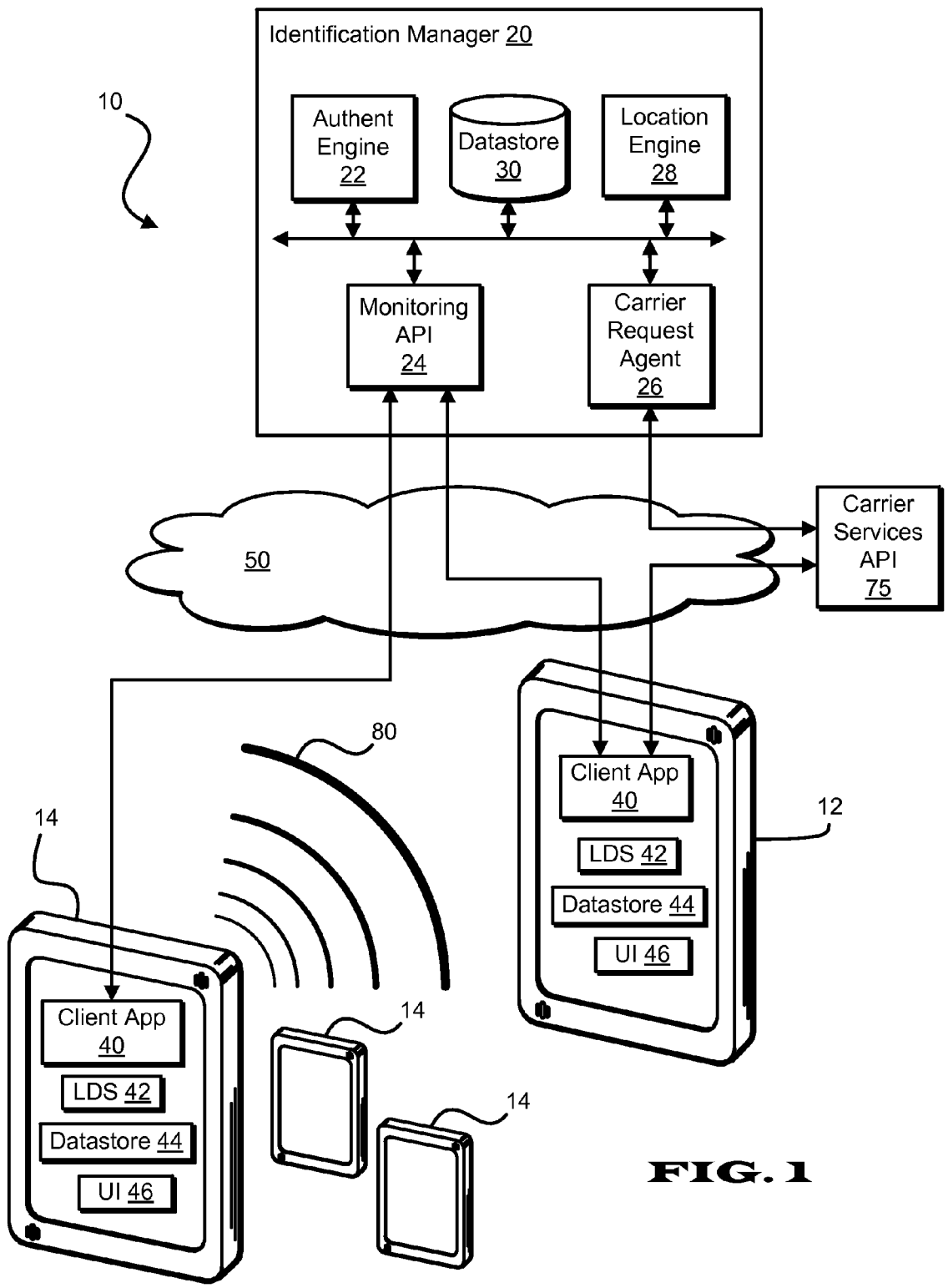
FIG. 1 shows a system for identifying devices in a shared mobile operating plan.

Phone numbers are not a particularly friendly way for users to recognize and identify phones and their owners. In fact, people's reliance on autodials and saved address books has led to a situation where people often cannot recall or recognize the phone numbers of their friends and family. This is a particular problem in family-oriented products where it would be beneficial to represent the members of the user's operating plan in a user interface ("UI").

It would be beneficial to be able to automatically present a mobile communication device end user with the names and photos of the people who hold the devices associated with the other phone lines on the end user's shared operating plan. It would also be beneficial to be able to automatically detect when a nearby device is on the end user's shared operating plan.

Smartphones and other mobile communication devices ("devices") have address books that associate phone numbers with names and photos of the mobile device user's contacts. But address books don't typically know who of those contacts is on the shared operating plan.

Mobile operators typically have Application Program Interfaces ("APIs") or other integration points which allow a trusted third party service to query for a list of phone numbers on a shared plan given one of the phone numbers. This is treated as a protected resource, as information about shared operating plans is understood to be sensitive.

Smartphones sometimes provide local applications with access to the device's phone number. But this can be spoofed. Smartphones sometimes provide local applications with access to the device's text messaging services for sending and/or receiving text messages.

Described here is a system and method to securely present an end user with the names and photos of the people who hold the devices associated with the other phone lines on the end user's shared operating plan and to automatically detect when a nearby device is on the end user's shared plan.

The first step is to confidently obtain a phone number from the device. If an API is available to query the device's phone number, this can be used as a guideline. But as noted above, this can be spoofed and is therefore not sufficient for querying sensitive information like the list of phone numbers on a shared mobile operating plan. To increase confidence in the phone number, an application on the device submits the phone number to a server via a secure network connection. The server then sends a secret token via text message to the device. The application on the device monitors incoming text messages. Upon receipt of the secret token it submits the secret token back to the server via a secure network connection, completing the loop and increasing confidence that the phone number is correct. If a phone number API is not available, the device can ask the user to enter the phone number.

An alternative flow is to have the application on the phone contact the server via a secure network connection. The server then transmits a secret token to the application. The application sends this token via text message to the server. In receiving the text message, the server sees the originating device's phone number. This completes the loop and increases confidence that the phone number is correct.

With a verified phone number in hand, the server or application on the device can interface with the mobile operator's infrastructure to lookup the other phone numbers on the shared operating plan.

The system (e.g. server or device application) can, if required, authenticate itself with the mobile operator's infrastructure to identify itself as a trusted partner before the infrastructure will share this sensitive information.

With a list of phone numbers in hand corresponding to the shared plan, the application on the device can cross reference those phone numbers with entries in the device's address book. This allows the device application to translate the list of phone numbers into a set of names and/or photos. This list may be presented to the user within a UI of an application running on the device. Or it may be transmitted back to the server for use in a web UI or other UI remote from the phone.

The application (e.g., software) can be installed on other devices in the shared operating plan, and that application can use the same flow as above to verify its phone number and identify itself and the other phone numbers in its shared operating plan. Applications on two mobile device clients can then recognize proximity to each other using any combination of explicit positioning services such as GPS or inferred co-positioning methods, such as being connected to the same WiFi router or registering each other's blue tooth signals. Thus the described system and method can also be used to automatically identify devices on the shared operating plan that are in proximity to one another.

Referring to FIG. 1, a system 10 is provided including an identification manager 20 used for identifying mobile communication devices operating under a shared mobile operating plan. The identification manager 20 includes an authentication engine 22, a monitoring application program interface ("API") 24, a carrier request agent 26, a location engine 28, and a datastore 30. The identification manager 20 and components thereof can be implemented on one or more network-connectable computing systems and need not be implemented on a single system at a single location, but can be decentralized for example in a peer-to-peer configuration. The identification manager 20 is configured for communication via a network 50 with other network-connectable computing systems including one or more devices 12 ("member device 12") corresponding to a user ("member user") who is a member of a shared operating plan. The identification manager 20 is further configured for communication via a network 50 with other network-connectable computing systems including one or more devices 14 ("co-member devices 14") corresponding to one or more other users ("co-member users") who are co-members of the shared operating plan with the member user. For convenience of description co-member devices 14 and the member device 12 are labeled as different devices. However, the member device 12 and co-member devices 14 can be identically configured and function in generally the same manner.

The network 50 can include one or more wired or wireless networks, including for example the Internet and wireless carrier systems. The member device 12 and co-member devices 14 can each include for example a smartphone, laptop computer or other wired or wireless terminal which can be configured to operate on a wired or wireless telecommunication network. The operation of the identification manager 20 is described herein with respect to the member device 12 and co-member devices 14. One skilled in the art will recognize that the identification manager 20 can operate with other suitable wired or wireless computing systems.

Software and/or hardware residing on the member device 12 and co-member devices 14 enable a client application 40 which communicates with the monitoring API 24 of the identification manager 20. The client application 40 is configured to cooperate with the identification manager 20 to identify a particular phone number associated with a particular device 12, 14. For a particular phone number associated with a shared operating plan, the client application 40 is further configured to transmit a request for other phone numbers corresponding to the shared operating plan, for example corresponding to co-member devices 14. Such request can be made from the client application 40 to the identification manager 20, which can relay the request via the carrier request agent 26 to a carrier services API 75 enabled for example by a computing system operated by a telecommunication carrier. Alternatively, the request can be transmitted from the client application 40 directly to the carrier services API 75, or the request can be transmitted substantially autonomously from the identification manager 20 to the carrier services API 75 without a request by the client application 40.

Hardware on the devices 12, 14 enables one or more wireless protocols including for example Bluetooth or WiFi. Signaling hardware enables transmission of a MAC address or other identifier, the identifier uniquely identifying the devices 12, 14. In addition to components enabling data processing and wireless communication, the devices 12, 14 include location determination systems ("LDS") 42 such as a global positioning system ("GPS") receiver, from which the devices 12, 14 gather data used for determining their location. Alternatively, the devices 12, 14 can be provided without a GPS or other location determining system.

Figure 2A:
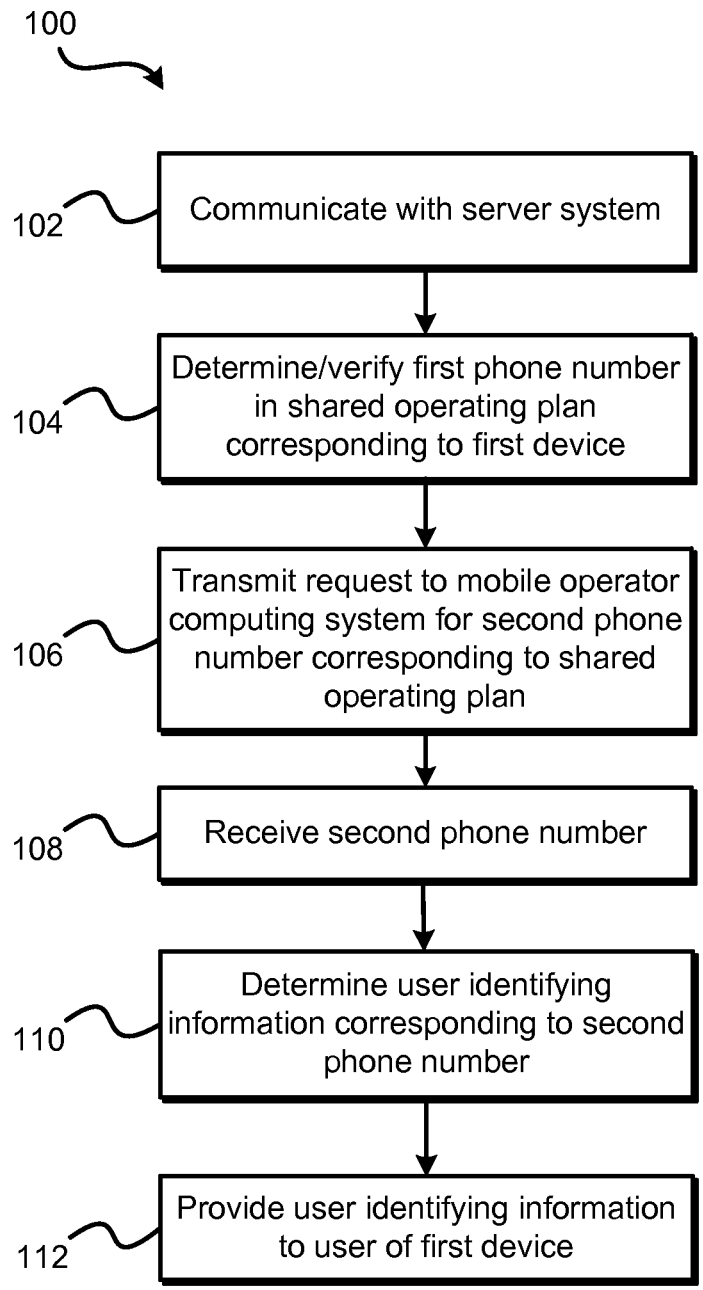
FIG. 2A is a flowchart showing a method for identifying users in a shared mobile operating plan.

Referring to FIG. 2A, a method 100 for identifying users in a shared mobile operating plan use is shown. The method 100 is described with reference to the components shown in the systems described in FIG. 1 which are preferably configured for performing the method 100 and include or have access to suitable non-transitory data storage including instructions for performing the method 100. The method 100 may alternatively be performed via other suitable systems and devices. The method 100 is not limited to the components shown in FIG. 1 which are merely exemplary.

In a step 102, an application (hereinafter "client application 40") executed by a processor of a first mobile communication device (hereinafter "member device 12"), communicates with a particular server system (hereinafter "identification manager 20") via a network (hereinafter "network 50"). In a step 104, based on the communication a first phone number (hereinafter "member device phone number") is determined and/or verified, the member device phone number corresponding to the member device 12 and corresponding to a particular shared operating plan enabled by a particular mobile operator. The determination and/or verification of the member device phone number can be performed by the identification manager 20, or alternatively, by the member device 12 via the application 40.

In a step 106, responsive to determining or verifying the member device phone number, a request is transmitted via a network to a computing system corresponding to the particular mobile operator, for example via the carrier services API 75, for at least a second phone number (hereinafter "co-member device phone numbers") corresponding to at least a second mobile communication device (hereinafter "co-member devices 14") and corresponding to the particular shared operating plan of the member device 12. The request can be transmitted by the member device 12 via the application 40 or by the identification manager 20 via the carrier request agent 26. The member device 12 or the application 40 can authenticate itself via the carrier services API 75 for example to identify itself as trusted before the mobile operator infrastructure will share co-member device phone numbers.

In a step 108, one or more co-member device phone numbers are received from the computing system corresponding to the particular mobile operator. The co-member device phone numbers can be received by the identification manager 20 from the carrier services API 75 and relayed to the member device 12 via the application 40. Alternatively, the member device 12 can receive the co-member device phone numbers directly from the carrier services API 75 via the application 40.

In a step 110, user identifying information corresponding to the co-member device phone numbers is determined based on data accessible via the member device 12. Such data can include a contact directory stored on the member device 12 or accessible to the member device 12 via a network. The user identifying information can be determined by cross referencing one or more co-member device phone numbers with contact entries stored on the member device 12 or otherwise accessible to the member device 12, for example stored by a social networking application on a network-accessible server. The user identifying information can include name and photo of a co-member corresponding to a co-member device phone number. Step 110 can be performed by a processor of the member device 12.

Figure 4A:
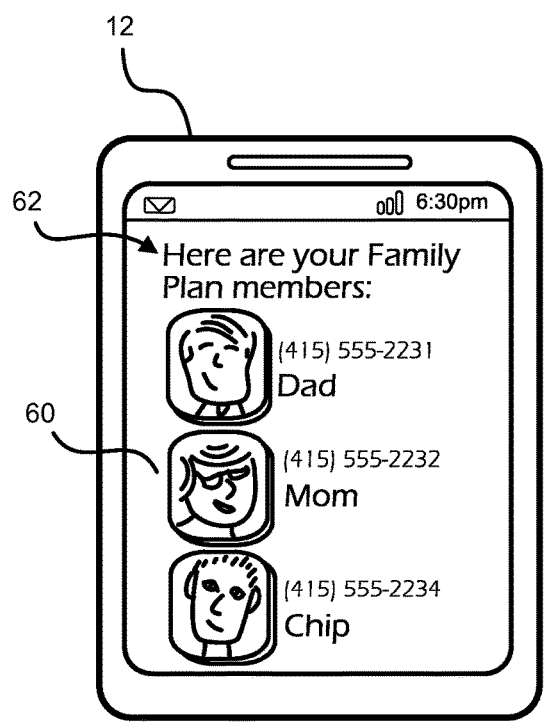
FIGS. 4A and 4B show a mobile communication device displaying illustrative messages regarding users in a shared mobile operating plan.

In a step 112, the user identifying information (e.g., name and photo) of one or more co-members is provided to the user of the member device 12. The user identifying information can be presented to the user by the application 40 on a user interface 46 of the member device 12. Alternatively, the user identifying information can be transmitted to the identification manager 20 or other system remote from the member device 12 to be provided to the user in a web interface or other user interface. Referring to FIG. 4A, a display 60 of the user interface 46 shows an exemplary illustrative message 62, generated by the application 40 pursuant to the method 100 showing names and photos of shared operating plan co-members corresponding to the user of the member device 12.

Figure 3A:
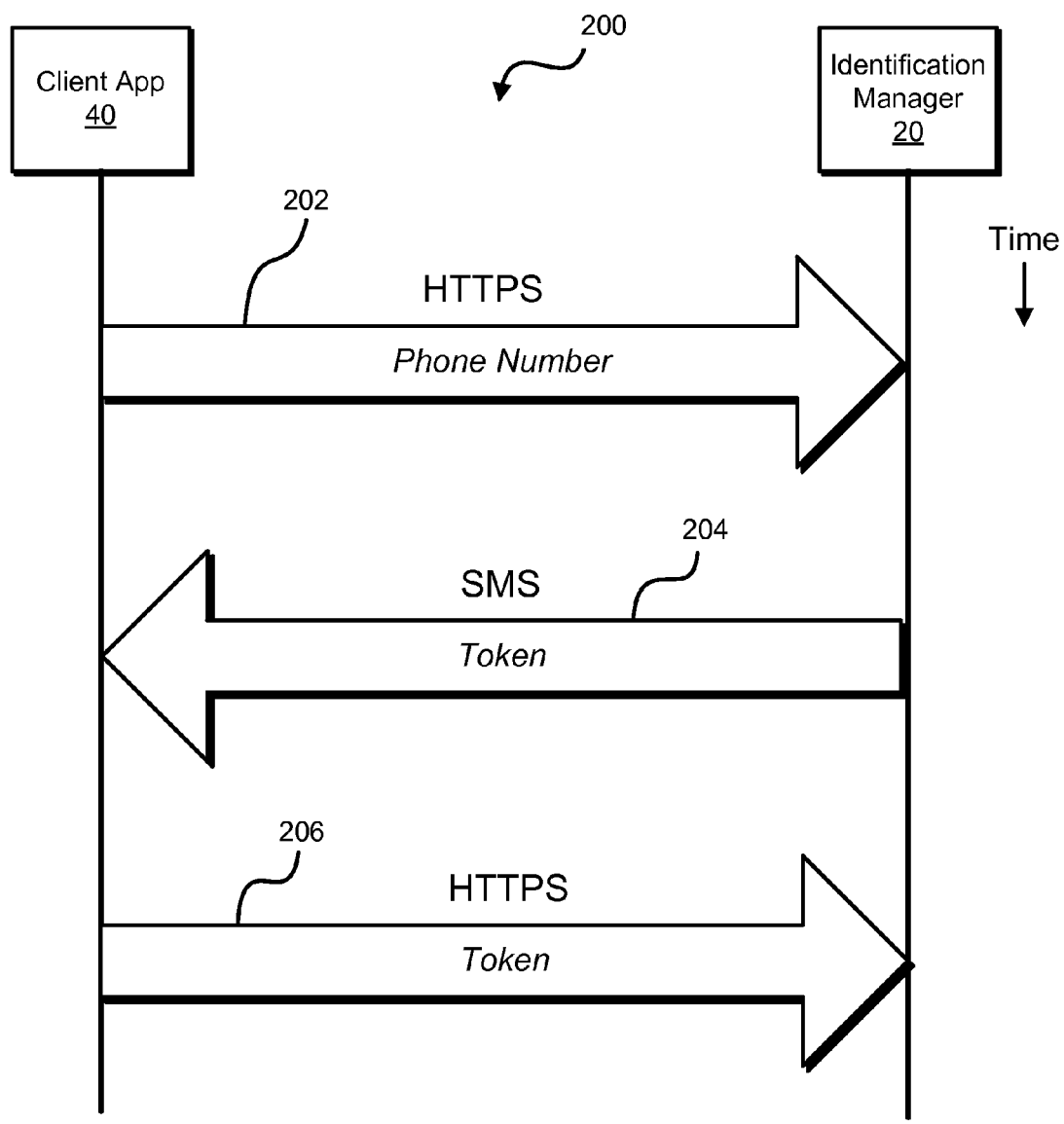
FIGS. 3A and 3B show communication flows between a client application and an identification manager illustrating processes for determining or verifying a phone number corresponding to a particular device.

Referring to FIG. 3A, a communication flow 200 between the application 40 and the identification manager 20 illustrates an exemplary process for determining or verifying a member device phone number. The application 40 obtains a phone number of the member device 12 from the device datastore 44 on the device, for example via a device-enabled API. If a device-enabled API is not available, the application 40 can alternatively query the member device user via the device user interface 46 to enter the device phone number. In a communication 202, the application 40 provides the determined phone number to the identification manager 20 via a secure network connection, for example implementing HTTPS over the network 50. Responsive to receiving the phone number of the member device 12, the identification manager 20 transmits a text message to the member device 12 in the form of an asynchronous communication 204 such as an SMS protocol message, the message including a security token. The application 40 monitors incoming text messages on the member device 12 to receive the token. The application 40 returns the token to the identification manager 40 in a communication 206 via a secure network connection, for example implementing HTTPS over the network 50, completing verification of the member device phone number. The processing to perform the determination or verification can be performed on the member device 12 via the application 40, the identification manager 20, or a combination of the member device 12 and the identification manager 20.

Figure 3B:
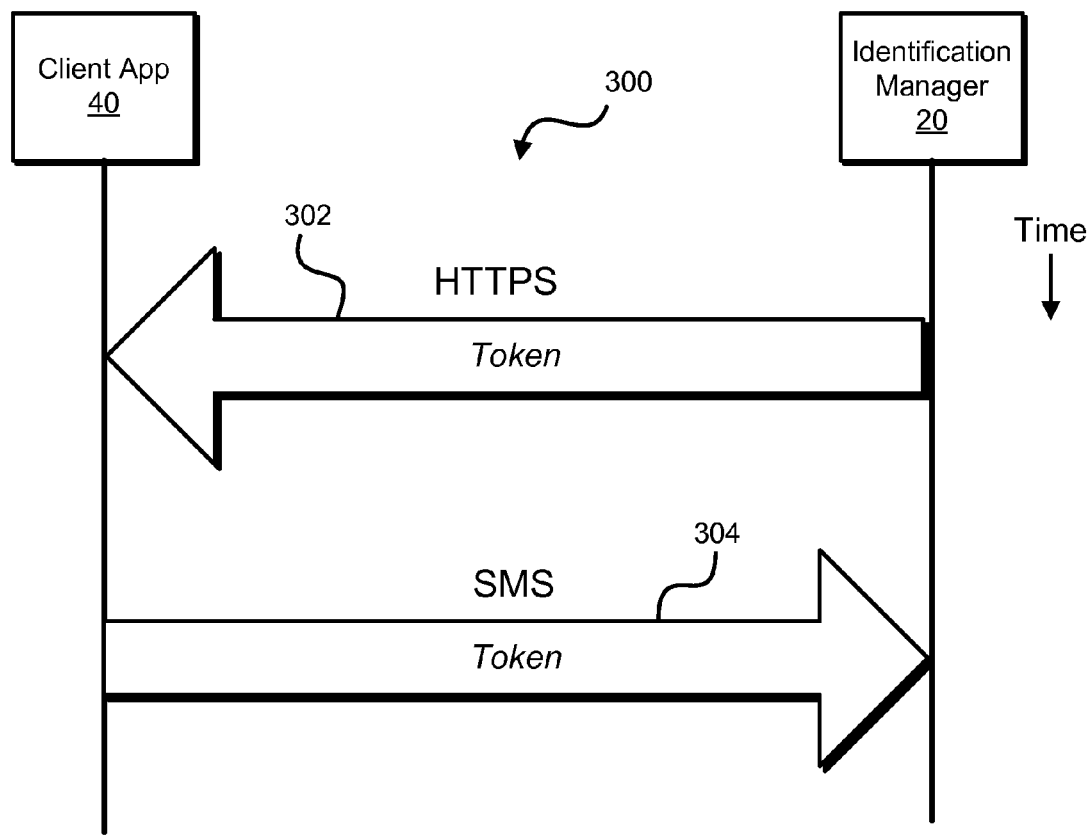

Referring to FIG. 3B, another communication flow 300 between the application 40 and the identification manager 20 illustrates an alternative exemplary process for determining or verifying a member device phone number. The application 40 contacts the identification manager 20 via a secure network connection. In a communication 302, the identification manager 20 provides a security token to the application 40 via the secure network connection, for example implementing HTTPS over the network 50. Responsive to receiving the token, the application 20 initiates transmission of a text message to the identification manager 20 in the form of an asynchronous communication 304 such as an SMS protocol message, the message including the security token. The messaging protocol of the asynchronous communication 304 allows the identification manager 20 to receive the member device phone number to complete the determination or verification process. The processing to perform the determination or verification can be performed on either or both of the application 40 and the identification manager 20.

As indicated above, the co-member devices 14 and the member device 12 are labeled as different devices for convenience of description, but can function identically. The client application 40 can function in the same manner executed on the co-member devices 14 as the member device 12, for example communicating with the identification manager (see step 102), determining/verifying the phone number of the co-member device 14 (see step 104), receiving phone numbers of other co-member devices 14 and the member device 12 (see step 108), determining user identifying information (see step 110), and providing user identifying information to a user (see step 112). In such manner each user in a particular shared operating plan has the opportunity to identify other users within the particular shared operating plan.

Figure 2B:
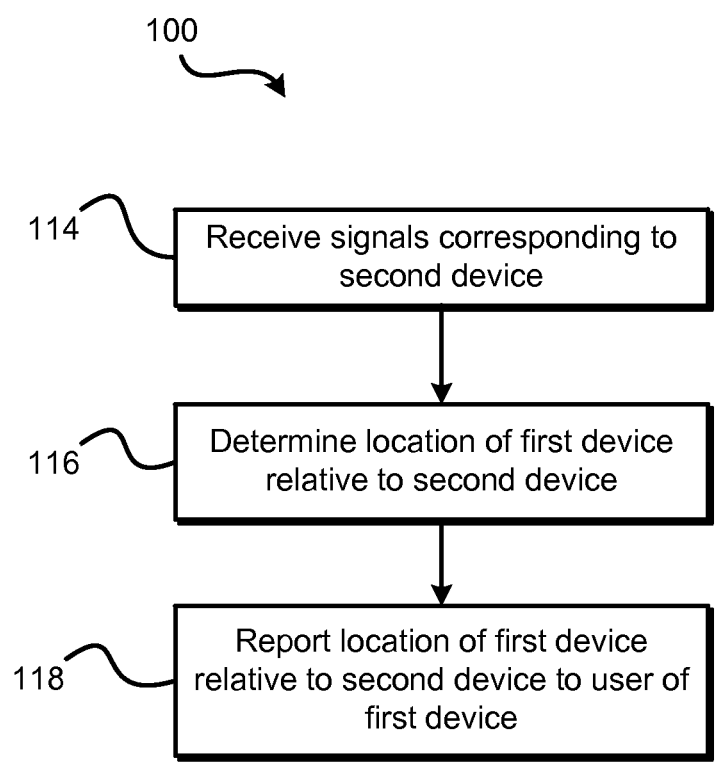
FIG. 2B is a flowchart showing a method for determining relative location of users in a shared mobile operating plan.

In addition to identifying co-member users within a particular shared operating plan, a member user is enabled by the system 10 to determine when a co-member device 14 is in the geographic proximity of a member device 12 of the member user. Referring to FIG. 2B, optional additional steps to the method 100 are shown. In a step 114, signals corresponding to a second mobile communication device (hereinafter "co-member device 14") corresponding to the co-member device 14 phone number are received. The location of the member device 12 relative to the co-member device 14 is determined based on the received signals (step 116), and the location of the member device 12 relative to the co-member device 14 is reported to the member user (step 118).

Figure 4B:
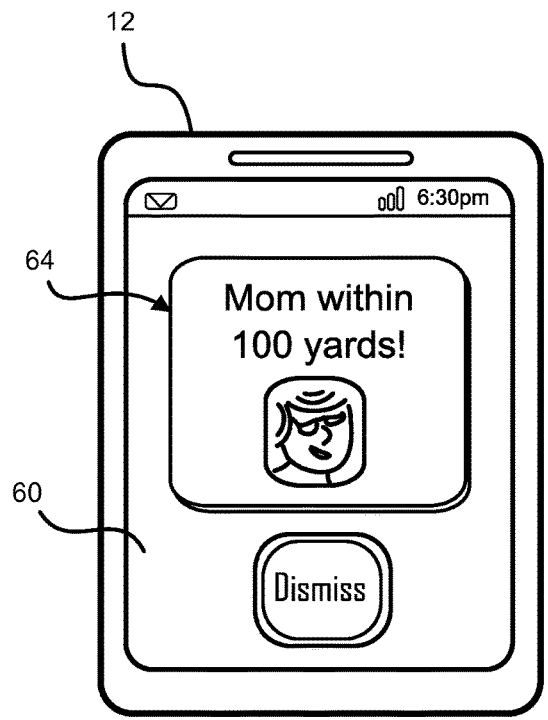

The signals received in step 114 can include radio signals 80 transmitted by the co-member device 14 and received and measured by the member device 12 to determine the location of the member device 12 relative to the co-member device 14 based on the measurement by the member device 12. Such measurement can include for example a signal strength measurement. Such radio signals can include for example Bluetooth protocol radio signals. Alternatively, the signals received by the member device 12 can include an indication of a wireless access point which the co-member device 14 is connected to, wherein the location of the member device 12 relative to the co-member device 14 is determined based on the member device 12 and the co-member device 14 being connected to the same wireless access point, for example a wireless router. Referring to FIG. 4B, a display 60 of the user interface 46 of a member device 12 shows an exemplary illustrative message 64 generated by the application 40 pursuant to steps 114 through 118 of FIG. 2A. The message 64 indicates that a user, "Mom", of a co-member device 14 is "within 100 yards" of the member device 12.

It should be noted that the co-member device 14 can receive signals corresponding to the member device 12, determine the location of the co-member device 14 relative to the member device 12, and report the relative location to the co-member user 14. In such manner each user in a particular shared operating plan has the opportunity to determine the relative location of other users within the particular shared operating plan.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
   obtaining by an application executed by a processor of a first mobile communication device a first phone number from a datastore on the first mobile communication device, the first phone number corresponding to a particular shared operating plan enabled by a particular mobile operator;
   transmitting by the application the first phone number to a particular server system via a network;
   receiving by the application an asynchronous message from the server system via the first phone number;
   verifying automatically by the application the message is from the server system based on a secure Hypertext Transfer Protocol ("HTTPS") communication responsive to the receipt of the asynchronous message from the server system;
   transmitting via at least one of the application or the particular server system a request via a network to a computing system remote from the first mobile communication device and corresponding to the particular mobile operator for at least a second phone number corresponding to at least a second mobile communication device and corresponding to the particular shared operating plan of the first mobile communication device;
   receiving the at least the second phone number from the computing system corresponding to the particular mobile operator;
   determining, by the processor of the first mobile communication device, user identifying information corresponding to the at least the second phone number based on data accessible via the first mobile communication device, the user identifying information comprising at least one of a user name or a user photo corresponding to the at least the second mobile communication device;
   receiving signals corresponding to the at least the second mobile communication device corresponding to the at least the second phone number;
   determining by the application a location of the first mobile communication device relative to the at least the second mobile communication device based on the received signals; and
   reporting to the user of the first mobile communication device the location of the first mobile communication device relative to the at least the second mobile communication device with the user identifying information corresponding to the at least the second phone number.

2. The method of claim 1, wherein verifying that the message is from the server system comprises automatically transmitting by the application the message from the server system back to the server system.

3. The method of claim 2, wherein the message from the server system comprises a token in an SMS text message to the first phone number.

4. The method of claim 1, further comprising determining and verifying the first phone number by a process comprising:
   receiving by the application the asynchronous message comprising a token from the server system via the first phone number;
   transmitting automatically by the application the token to the server system responsive to receiving the asynchronous message; and
   verifying by the server system the first phone number based on the token transmitted from the application.

5. A method comprising:
   obtaining by an application executed by a processor of a first mobile communication device a first phone number from a datastore on the first mobile communication device, the first phone number corresponding to a particular shared operating plan enabled by a particular mobile operator;

contacting a particular server system by the application via a network connection;
receiving by the application a transmission from the server system via the network connection; and
transmitting automatically by the application at least one element of the transmission from the server system via an asynchronous phone protocol, wherein the server system receives the first phone number
transmitting by the server system a request via a network to a computing system remote from the first mobile communication device and corresponding to the particular mobile operator for at least a second phone number corresponding to at least a second mobile communication device and corresponding to the particular shared operating plan of the first mobile communication device;
receiving the at least the second phone number from the computing system corresponding to the particular mobile operator;
determining, by the processor of the first mobile communication device, user identifying information corresponding to the at least the second phone number based on data accessible via the first mobile communication device, the user identifying information comprising at least one of a user name or a user photo corresponding to the at least the second mobile communication device;
receiving signals corresponding to the at least the second mobile communication device corresponding to the at least the second phone number;
determining by the application a location of the first mobile communication device relative to the at least the second mobile communication device based on the received signals; and
reporting to the user of the first mobile communication device the location of the first mobile communication device relative to the at least the second mobile communication device with the user identifying information corresponding to the at least the second phone number.

6. The method of claim 1, the method further comprising:
receiving by the server system the at least the second phone number from the computing system corresponding to the particular mobile operator; and
transmitting by the server system the second phone number to the application executed by the processor of the first mobile communication device.

7. The method of claim 1, wherein determining the user identifying information comprises cross referencing the at least the second phone number with contact entries stored on the first mobile communication device.

8. The method of claim 1, wherein determining the user identifying information comprises cross referencing the at least the second phone number with contact entries accessible to the first mobile communication device.

9. The method of claim 1, further comprising:
determining by the application the location of the first mobile communication device via a Global Position System (GPS) receiver on the first mobile communication device; and
determining by the application the location of the first mobile communication device relative to the second mobile communication device based on the determined location of the first mobile communication device.

10. The method of claim 1, further comprising:
receiving the signals corresponding to the second mobile communication device as an indication of a wireless access point which the second mobile communication device is connected to; and
determining the location of the first mobile communication device relative to the second mobile communication device based on the first and second mobile communication devices being connected to a same wireless access point.

11. The method of claim 10, wherein the wireless access point comprises a wireless router.

12. The method of claim 1, further comprising:
receiving by the first mobile communication device radio signals transmitted by the second mobile communication device;
measuring by the first mobile communication device the radio signals transmitted by the second mobile communication device; and
determining the location of the first mobile communication device relative to the second mobile communication device based on the measuring by the first mobile communication device.

13. The method of claim 12, wherein the radio signals comprise Bluetooth protocol radio signals.

14. The method of claim 1, further comprising transmitting signals corresponding to the first mobile communication device to the second mobile communication device.

15. The method of claim 1, further comprising displaying by the application the user identifying information in a display of the first mobile communication device.

16. The method of claim 1, further comprising transmitting by the application the user identifying information to the particular server system, and transmitting the user identifying information from the particular server system to the user.

17. A telecommunication network comprising:
a network connectable processor enabled server system configured for communication with a first mobile communication device corresponding to a particular shared operating plan; and
the first mobile communication device via an application and a processor is configured to:
transmit by the application a first phone number to the server system via a network;
receive by the application an asynchronous message from the server system via the first phone number;
verify automatically by the application the message is from the server system based on a secure Hypertext Transfer Protocol ("HTTPS") communication responsive to the receipt of the asynchronous message from the server system;
wherein:
at least one of the first mobile communication device or the server system is configured to request, via a network from a computing system remote from the first mobile communication device and corresponding to a particular mobile operator, at least a second phone number corresponding to at least a second mobile communication device and corresponding to the particular shared operating plan of the first mobile communication device;
at least one of the first mobile communication device or the server system is configured to receive the at least the second phone number from the computing system corresponding to the particular mobile operator;
the first mobile communication device is configured to determine user identifying information corresponding to the at least the second phone number based on data accessible via the first mobile communication device, and to provide the user identifying information via the application to a user of the first mobile communication device, the user identifying information comprising at least one of a user name or a user photo corresponding to the at least the second mobile communication device; and the first mobile communication device is further configured to:

receive signals corresponding to the at least the second mobile communication device corresponding to the at least the second phone number;

determine by the application a location of the first mobile communication device relative to the at least the second mobile communication device based on the received signals; and report to the user of the first mobile communication device the location of the first mobile communication device relative to the at least the second mobile communication device with the user identifying information corresponding to the at least the second phone number.

18. The method of claim 5, wherein the at least one element comprises a token.

\* \* \* \* \*